United States Patent [19]
Phelps et al.

[11] Patent Number: 5,994,865
[45] Date of Patent: Nov. 30, 1999

[54] APPARATUS AND METHOD FOR CONTROL OF AN EARTH MOVING IMPLEMENT

[75] Inventors: Stephen K. Phelps, Chillicothe; Robert R. Sychra, Washington, both of Ill.

[73] Assignee: Caterpillar Inc., Peoria, Ill.

[21] Appl. No.: 08/996,045

[22] Filed: Dec. 22, 1997

[51] Int. Cl.⁶ .................................................. G05B 19/18
[52] U.S. Cl. ................... 318/569; 318/600; 364/148.05; 706/4; 706/900; 701/50
[58] Field of Search ...................... 318/560–696; 364/148.05, 36, 44, 106; 706/48, 52, 900; 701/50

[56] References Cited

U.S. PATENT DOCUMENTS

| | | | |
|---|---|---|---|
| 4,733,355 | 3/1988 | Davidson et al. | 364/424 |
| 5,184,293 | 2/1993 | Middleton et al. | 364/167.01 |
| 5,397,973 | 3/1995 | Dummermuth | 318/628 |
| 5,497,063 | 3/1996 | Day et al. | 318/610 |
| 5,699,247 | 12/1997 | Moriya et al. | 364/424.07 |
| 5,704,200 | 1/1998 | Chmielewski et al. | 56/10.2 |

FOREIGN PATENT DOCUMENTS

| | | | |
|---|---|---|---|
| 0526639A1 | 4/1991 | European Pat. Off. | E02F 3/85 |
| 4204481A1 | 2/1992 | Germany | G01S 15/08 |
| 3-43523 | 2/1991 | Japan | E02F 3/85 |
| 6-167036 | 6/1994 | Japan | E02F 9/22 |
| 98/13557 | 4/1998 | WIPO | E02F 9/22 |

*Primary Examiner*—David Martin
*Attorney, Agent, or Firm*—R. Carl Wilbur

[57] ABSTRACT

An earth moving or construction equipment implement control system is disclosed. The control system includes a fuzzy logic controller that is connected to an electro-hydraulic valve. An implement position sensing system senses the height of the implement. A set point is compared to the implement position to produce an implement position error signal which is an input to the fuzzy logic controller.

7 Claims, 2 Drawing Sheets

APPARATUS AND METHOD FOR CONTROL OF AN EARTH MOVING IMPLEMENT

TECHNICAL FIELD

The present invention relates generally to earth moving and construction equipment, and more particularly, to an apparatus and method for controlling an implement on earth moving or construction equipment.

BACKGROUND ART

Earth moving equipment such as motor graders, bulldozers and the like typically have a controllable implement that moves the earth. Likewise, construction equipment, like a cold planer, used in connection with resurfacing roadways, will have an implement that contacts the ground. The implement is manually controlled by an operator who manipulates a series of levers or other devices to effect the desired motion. Many tasks require a high level of skill and demand high levels of operator attention to perform. For example, when manually grading a surface, the operator must pay close attention to the height of the implement to make sure that it stays relatively constant with respect to the surface to thereby prevent the implement from digging too deeply and gouging the surface or raising too high and leaving a bump in the graded surface. While an experienced operator can generally perform this task, inexperienced operators or fatigued experienced operators are much less efficient.

To overcome this problem, various devices have been developed to automatically control the height of the implement. For example, one such system employs a datum, typically in the form of string grade line that is placed at a predetermined height above the desired grade. A sensing unit is attached to the implement and includes a wand that extends from the sensing unit and rests on the string grade line. As the implement height changes, the wand's relation to the grade line changes, causing the sensing unit to generate an error signal. The error signal is then used by the control system to automatically adjust the height of the implement. One drawback to the use of the wand system is that if the spring force of the wand is excessive, or if the string grade line is loosely strung, then the wand can displace the string from its desired position, thereby introducing an error in the control of the implement. Another drawback is that the wand must be on the string grade line to operate properly. To start automatically operating the implement, the operator must get out of the machine and set the wand on the string line. If the wand falls off of the string line, the sensing unit will produce a large error signal which will cause the implement to gouge the earth surface.

An automatic control system that uses an ultrasonic range finding device, has been developed to overcome some of these problems associated with prior art automatic control systems. For example, one such system is disclosed in U.S. Pat. No. 4,733,355 issued to Davidson et al. In that device, an ultrasonic range finding device is mounted to the implement and measures a separation distance from the range finding device to the earth's surface. A comparison circuit periodically compares the measured separation distance to a first, second, and third predetermined intervals and produces a positive error signal if the separation distance is within the limits of the first comparison interval, generates no error signal if the separation distance is within the second comparison interval and generates a negative error signal if the separation distance is within the third comparison interval. One drawback with the system disclosed in Davidson et al. is that it will not work outside the predetermined comparison intervals. Thus, the operator must manually move the implement to a position within one of the three comparison intervals before the system will automatically position the implement.

It would be preferable to have a control system that overcomes these and other drawbacks associated with the prior art.

DISCLOSURE OF THE INVENTION

The present invention provides a fuzzy logic controller for control of an implement position on earth moving or construction equipment. The apparatus includes an implement position sensor that senses the position of the implement relative to the ground. The position sensor provides a signal to the controller. The controller computes an error signal based on the position signal and a desired position and calculates a fuzzy control signal. The fuzzy control signal is used in connection with an actuator to responsively move the implement.

These and other aspects, objects and advantages of the present invention will become apparent upon reading the detailed description of the best mode in connection with the drawings and appended claims.

BRIEF DESCRIPTION OF THE DRAWINGS

Throughout the specification and these drawings like reference numerals refer to like parts. The drawings included in the present application are.

BEST MODE FOR CARRYING OUT THE INVENTION

The present invention is applicable to earth moving and construction equipment that requires accurate positioning of an implement with respect to the surface of the earth. For example, motor graders and bulldozers are often used to grade the earth to a desired level to construct a road. That equipment performs the task most efficiently when the implement, in this case a blade, is held at the desired plane. In other construction equipment, the position of other implements must be accurately controlled. For example, an embodiment of the present invention can be used in connection with a screed on an asphalt paving machine. By accurately controlling the height of the screed from the surface to be paved, the operator can better insure that the paving machine will lay down a coat of asphalt with a uniform thickness. Likewise, when used in connection with a cold planer (a device that removes asphalt from a road for recycling) it is important to control the height of the mill accurately so that it does not dig too deeply into the surface while also making sure it is working deeply enough to remove the desired amount of asphalt. An embodiment of the present invention may be applied on each of these and other similar pieces of earth moving and construction equipment.

Figure 1:
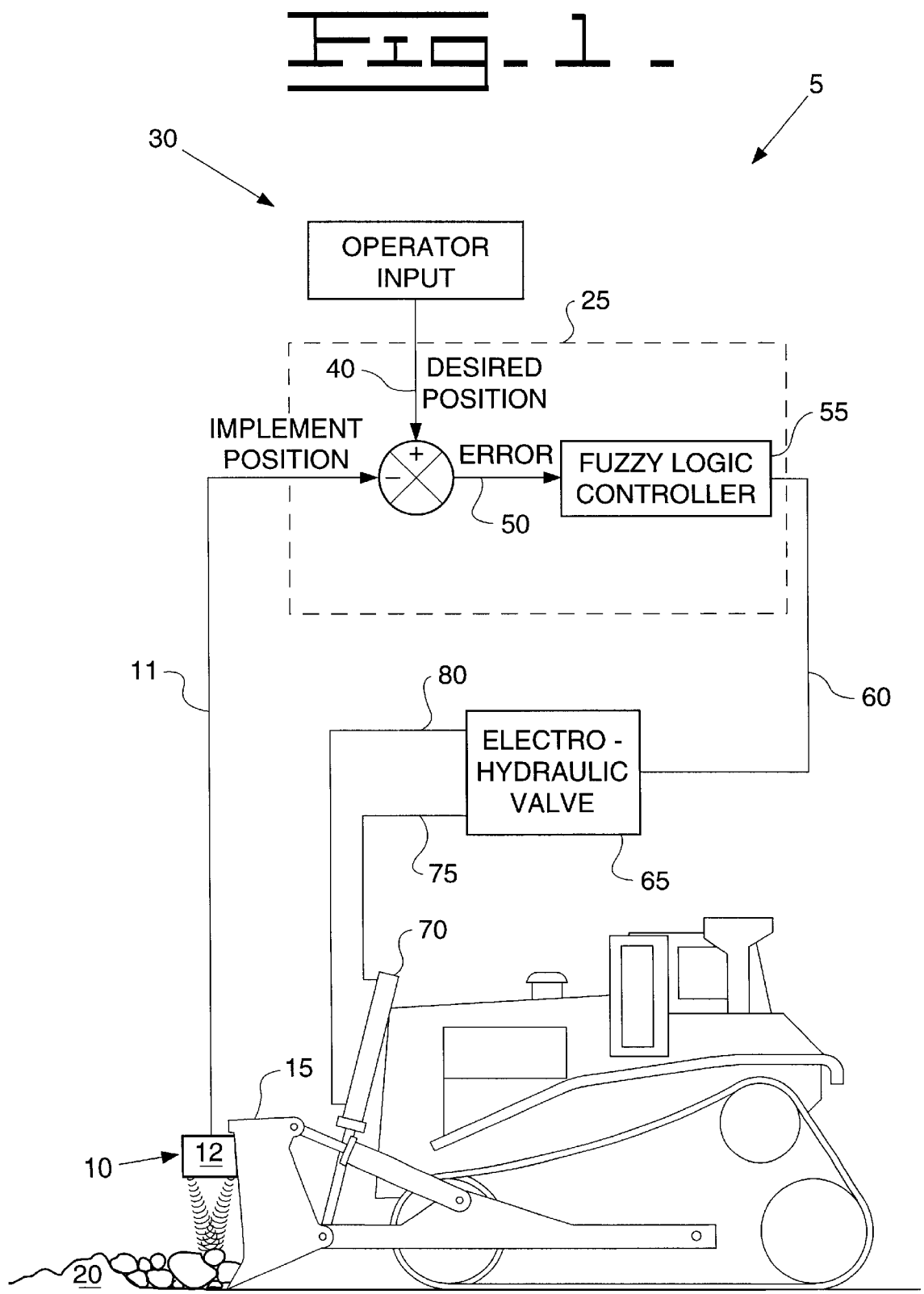
FIG. 1, a system level block diagram of the implement control in a preferred embodiment of the present invention.

Referring first to FIG. 1, a block diagram of a preferred embodiment of the implement control system 5 of the present invention is shown. A position sensing device 10 is connected to an implement 15 whose height is to be controlled. In a preferred embodiment, the position sensing device 10 is an ultrasonic distance measuring device 12 which emits ultrasonic sound that bounces off the ground 20. The distance measuring device 12 determines the distance to the ground 20 from the time between the emission of the sound and the time when it returns to the device 12 and the frequency of the emitted sound. Such ultrasonic distance measuring devices 12 are well known in the art. Although the present invention uses an ultrasonic distance measuring device 12, other well known position sensing devices could be readily and easily substituted without deviating from the scope of the present invention as defined by the appended claims. For example, a wand, potentiometer and grade string line combination could be used. Another position sensor could be a wheel or other ground contacting device connected to a potentiometer by a lever arm, among others.

The ultrasonic distance measuring device 12 is electrically connected to an electronic controller 25 and produces an actual implement position signal 11. Also connected to the electronic controller 25 is an operator input 30. In a preferred embodiment, the operator input 30 is the combination of switches and a display which produces a desired implement position signal 40. The operator manipulates the switches and the display indicates the selected desired implement position 40. Although switches and a display are used in connection with a preferred embodiment of the present invention, other known operator input devices 30 could be readily and easily substituted without deviating from the scope of the present invention as defined by the appended claims. For example, a numeric keyboard, potentiometer, linear potentiometer or other devices could be used.

The electronic controller 25 subtracts the actual implement position signal 11 from the desired implement position 40 to produce an error signal 50. The error signal 50 is then used as an input to the fuzzy logic controller 55, which in the preferred embodiment of the invention is performed by the electronic controller 25. The fuzzy logic controller 55 and the electronic controller 25 output an implement fuzzy control signal 60. The implement fuzzy control signal 60 is an input to an electro-hydraulic valve 65, and controls the flow of pressurized hydraulic fluid to a hydraulic actuator cylinder 70 through fluid conduits 75, 80 which raises or lowers the implement 15. The electro-hydraulic valve 65 is a known assembly and therefore will not be discussed further herein.

Figure 2:
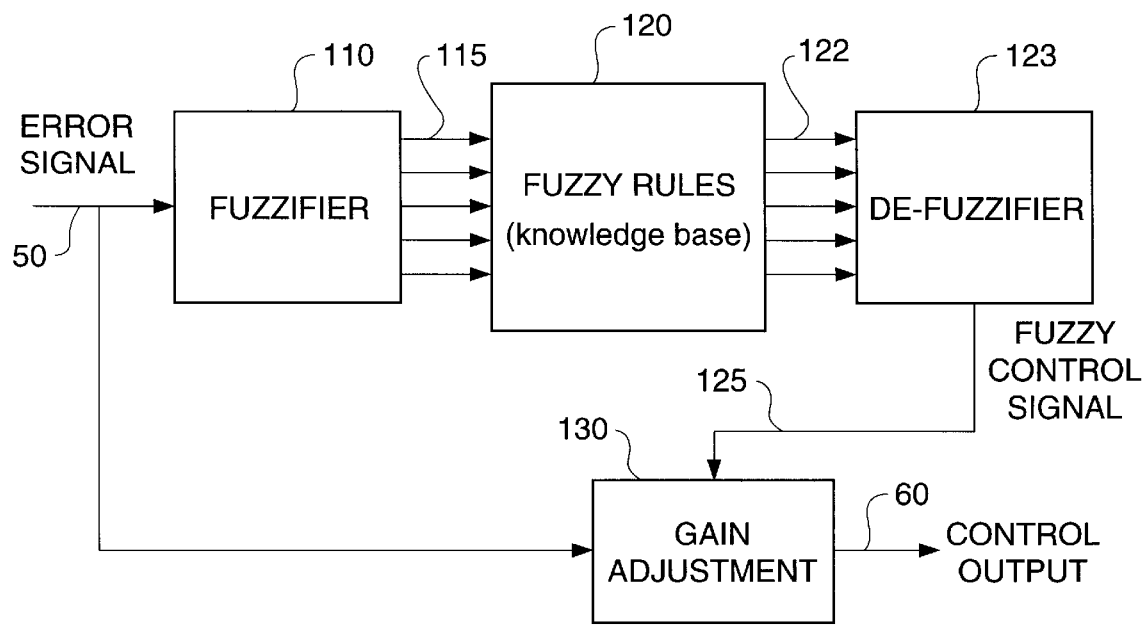
FIG. 2, a block diagram of a preferred embodiment of fuzzy logic implemented in connection with the present invention.

Referring now to FIG. 2, a more detailed view of the fuzzy logic controller 55 of FIG. 1 is shown. As shown in FIG. 2, the error signal 50 is an input to both the fuzzifier block 110 and a gain adjustment block 130. As is explained in more detail below with reference to FIG. 3, the fuzzifier block 110 takes the crisp error signal 50 and produces a fuzzy output 115 comprised of five components. Although the preferred embodiment uses five components, a greater or fewer number of components could be used without deviating from the scope of the present invention as defined by the appended claims. A fuzzy rules block 120, explained in more detail below, modifies the fuzzy output 115 according to a predetermined set of rules. The output of the fuzzy rules block 120 is a gain signal 122 which remains in five components. A de-fuzzifier block 123 receives the gain signal 122 and produces a single fuzzy control signal 125 that is an input to the gain adjustment block 130. Each of these blocks is discussed in more detail below.

Figure 3:
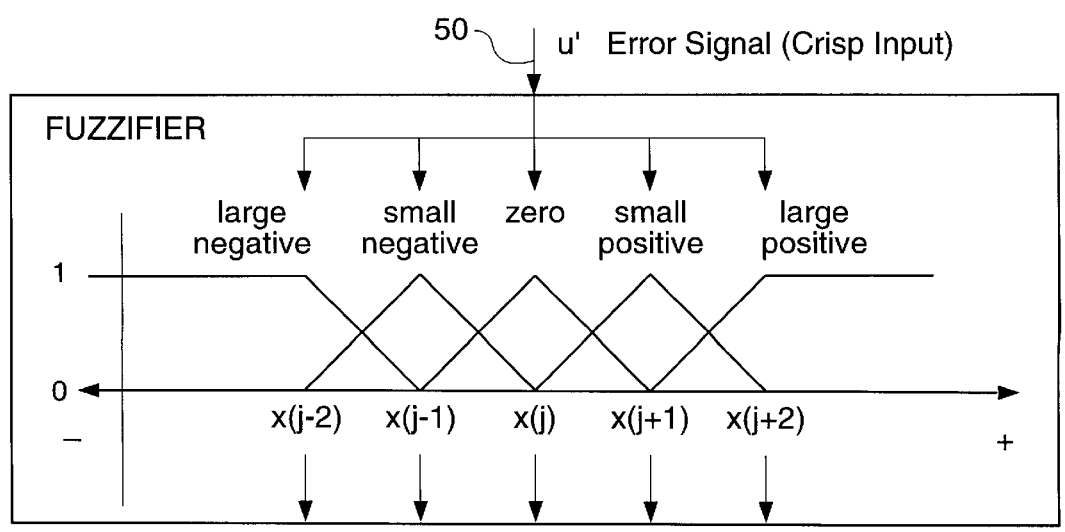
FIG. 3, a detailed drawing of a preferred embodiment of fuzzy logic implemented in connection with the present invention.

Referring now to FIG. 3, a graphical representation of the fuzzifier block 110 is shown. The crisp error signal 50 is broken into component parts defined by the fuzzified output function $F(u')=\{f(1),f(2),f(3),f(4),f(5)\}$. The error signal 50 input represents the independent axis and the dependent axis ranges from zero to one and represents the normalized contribution of each of the five components of $F(u')$. For example, for an error signal 50 less than the value $x(j-2)$, $f(1)$ will equal one while the other functions will be zero. The output of the fuzzifier for such an input is $F(u')=\{1,0,0,0,0\}$. In a preferred embodiment, the rules for the fuzzifier block 110 follow. It should be recognized, however, that the present invention as defined by the appended claims, is not limited to a system using these rules. To the contrary, there are many other fuzzifier functions and distributions that could be used without deviating from the scope of the present invention as defined by the appended claims.

The graphical representation of the preferred embodiment of the fuzzifier block 110 shown in FIG. 3, is implemented by the electronic controller 25 by first determining where the crisp input falls on the graph in relation to the predetermined boundary points $x(j-2)$, $x(j-1)$, $x(j)$, $x(j+1)$, and $x(j+2)$. Then, if the error signal $u(k)$:

1. If $u(k)<x(j-2)$ then $F(u')=\{1,0,0,0,0\}$
2. If $u(k)>x(j-2)$ then $F(u')=\{0,0,0,0,1\}$
3. If $x(j-2)<=u'(k)<x(j-1)$
   Then set $f(3)=0$, $f(4)=0$ and $f(5)=0$ calculate $f(1)$ and $f(2)$
   $f(2)=[u'(k)-x(j(2)]/[x(j-1)-x(j-2)]$
   $f(1)=1-f(2)$
   fuzzified output is $F(u')=\{f(1),f(2),f(3)=0,f(4)=0, f(5)=0\}$
4. If $x(j-1)<=u'(k)<x(j)$
   Then set $f(1)=0$, $f(4)=0$ and $f(5)=0$
   calculate $f(2)$ and $f(3)$
   $f(3)=[u'(k)-x(j-1)]/[x(j)-x(j(1)]$
   $f(2)=1-f(3)$
   fuzzified output is $F(u')=\{f(1)=0,f(2),f(3),f(4)=0,f(5)=0\}$
5. If $x(j)<=u'(k)<x(j+1)$
   Then set $f(1)=0,f(2)=0$ and $f(5)=0$
   calculate $f(3)$ and $f(4)$
   $f(4)=[u'(k)-x(j)]/[x(j+1)-x(j)]$
   $f(3)=1-f(4)$
   fuzzified output is $F(u')=\{f(1)=0,f(2)=0,f(3),f(4),f(5)=0\}$
6. If $x(j+1)<=u'(k)<x(j+2)$
   Then set $f(1)=0,f(2)=0$ and $f(3)=0$
   calculate $f(4)$ and $f(5)$
   $f(4)=[u'(k)-x(j+1)]/[x(j+2)-x(j+1)]$
   $f(5)=1-f(4)$
   fuzzified output is $F(u')=\{f(1)=0,f(2)=0,f(3)=0,f(4),f(5)\}$ Once the electronic controller 25 computes the fuzzified function output $F(u')$ 115, $F(u')$ is input to the fuzzy rules block 120, which computes a gain vector $K(F)$ 122.

In a preferred embodiment of the present invention, the fuzzy rules block 120 calculates the gain vector $K(F)=\{k(1),k(2),k(3),k(4),k(5)\}$, based on the fuzzified input $F(u')$ 115, as follows:

$k(1)=f(1)*Knegmin$ $k(2)=f(2)*Knegmed$ $k(3)=f(3)*Kmax$ $k(4)=f(4)*Kposmed$ $k(5)=f(5)*Kposmin$ where Knegmin=constant minimum negative gain value;
Knegmed=constant medium negative gain value;
Kmax=maximum gain constant
Kposmed=constant medium positive gain value;
Kposmin=constant minimum positive gain value.

In a preferred embodiment, there are five predetermined gain constants stored in memory as noted in the above equations. However, there could be a greater or fewer number of constants used in connection with an alternative embodiment without deviating from the scope of the present invention as defined by the appended claims. The specific gain values used for Knegmin, Knegmed, Kmax, Kposmed, and Kposmin depend on a number of factors, as is known to those skilled in the art. For example, the system dynamics and desired control objectives are important consideration in developing these values. Once the system dynamics have been determined and the control objectives selected it is within the capability of someone skilled in the art to readily and easily develop the gain values. Other embodiments with different control objectives, or used in connection with other machines, will typically use other gain values and will nevertheless fall within the scope of the present invention as defined by the appended claims.

As noted above, the output of the fuzzy rules base block 120 is the gain vector K(F) 122. The gain vector K(F) 122 is an input to the de-fuzzifier block, which combines the individual components of the gain vector to produce a single fuzzy control signal 125. In a preferred embodiment of the present invention, the de-fuzzifier block computes the fuzzy control signal 125 by summing the individual gain vector 122 components. Thus, in a preferred embodiment the fuzzy control signal 125 is equal to k(1)+k(2)+k(3)+k(4)+k(5). Although the preferred embodiment includes a summation in the de-fuzzifier block 123, there are other known ways in which the gain vector components could be manipulated to produce a single fuzzy control signal 125. For example, it is possible to choose a center of mass approach or any other computation that will combine five components into a single output.

The fuzzy control signal 125 is an input to the gain adjustment block 130. The gain adjustment block 130 computes a control output 60 as a product of the error signal 50 and the fuzzy control signal 125. As shown previously with respect to FIG. 1, the control output 60 is then used by the electro-hydraulic valve 65 to control the position of the implement 15.

As described herein, a preferred embodiment of the present invention provides automatic control of the height of the implement while overcoming the disadvantages associated with the prior art.

We claim:

1. An apparatus for controlling the position of an implement on construction equipment, said apparatus comprising:
   a position sensing device associated with said implement, said position sensing device producing an implement position signal;
   an operator input producing a desired position signal;
   an electronic controller receiving said implement position signal and said desired position signal and producing an error signal;
   wherein said electronic controller includes control logic with an associated system gain, a fuzzy logic controller receiving said error signal and responsively adjusting the system gain, said electronic controller producing an implement control signal as a function of said gain and said error signal;
   an implement positioning device, said device responding to the implement control signal to move the implement.

2. The apparatus according to claim 1, including an electronic controller, said electronic controller including said fuzzy logic controller.

3. An apparatus for controlling the position of an implement on construction equipment, said apparatus comprising:
   position sensing means for sensing the position of the implement above a surface and producing an implement position signal;
   an electronic controller, said electronic controller producing an implement control signal in response to said implement position signal and a desired implement position;
   implement position means for receiving the implement position signal and responsively positioning the implement;
   wherein said electronic controller includes a fuzzy logic controller that adjusts a system gain in response to an error signal between said implement position signal and said desired implement position.

4. The apparatus according to claim 3, wherein said position sensing means includes a ultrasonic sensing device.

5. The apparatus according to claim 3, wherein said implement position means includes a hydraulic cylinder and an electro-hydraulic control valve.

6. A method of controlling an implement on construction equipment, said method comprising:
   determining an actual implement position;
   comparing said implement position to a desired implement position;
   producing an error signal in response to said step of comparing;
   using fuzzy logic in connection with said error signal to produce a control signal;
   controlling the implement position is response to said control signal; and
   wherein said step of using fuzzy logic includes producing a fuzzified error signal, applying fuzzy rules to the fuzzified error signal, producing a fuzzy control signal in response to said step of applying, and adjusting a system gain based on said step of producing a fuzzy control signal.

7. An apparatus for controlling the position of an implement on construction equipment, said apparatus comprising:
   an implement position sensor;
   an operator input;
   an implement actuator;
   an electronic controller connected with said implement position sensor, said operator input and said implement actuator;
   wherein said electronic controller includes a fuzzier, fuzzy rules, a de-fuzzifier, and control logic having a system gain; and
   wherein said de-fuzzifier produces an output signal that modifies the system gain.

* * * * *